United States Patent
Ashida et al.

(10) Patent No.: US 11,427,691 B2
(45) Date of Patent: Aug. 30, 2022

(54) METHOD FOR PRODUCING A SELF-ADSORBING FOAM SHEET AND METHOD FOR PRODUCING A SELF-ADSORBING LAMINATED FOAM SHEET

(71) Applicant: ZEON CORPORATION, Tokyo (JP)

(72) Inventors: Shinsuke Ashida, Tokyo (JP); Atsushi Sone, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/898,437

(22) Filed: Jun. 11, 2020

(65) Prior Publication Data

US 2020/0298527 A1  Sep. 24, 2020

Related U.S. Application Data (62) Division of application No. 15/557,490, filed as application No. PCT/JP2016/050314 on Jan. 7, 2016, now abandoned.

(30) Foreign Application Priority Data

Mar. 17, 2015  (JP) ................. 2015-052998

(51) Int. Cl.
  *C08J 9/00* (2006.01)
  *B32B 27/30* (2006.01)
  (Continued)

(52) U.S. Cl.
  CPC .............. *C08J 9/0028* (2013.01); *B32B 5/18* (2013.01); *B32B 27/30* (2013.01);
  (Continued)

(58) Field of Classification Search
  None
  See application file for complete search history.

(56) References Cited

U.S. PATENT DOCUMENTS 8,247,509 B2   8/2012  Okamoto et al.
2009/0291301 A1  11/2009  Okamoto et al.
(Continued)

FOREIGN PATENT DOCUMENTS

CN    101586011 A    11/2009
CN    101824283 A     9/2010
(Continued)

OTHER PUBLICATIONS

Shindo, I, Suction Sheet and Its Applied Article, Jun. 27, 2000, machine translation of JP2000-177038 (Year: 2000).*
(Continued)

*Primary Examiner* — Chinessa T. Golden
(74) *Attorney, Agent, or Firm* — Kenja IP Law PC (57) ABSTRACT

A method for producing a self-adsorbing foam sheet is provided. The method comprising making a resin composition for a self-adsorbing foam sheet, the resin composition including: 100 parts by mass of a (meth)acrylic acid ester copolymer resin which includes an N-methylol group, and whose glass transition temperature is −10° C. or less; and 1 to 20 parts by mass of a carbodiimide crosslinking agent; foaming the resin composition, to obtain foam of the resin composition; and shaping the foam into a sheet and after that, carrying out crosslinking reaction on the (meth)acrylic acid ester copolymer resin.

5 Claims, 1 Drawing Sheet

(51) Int. Cl.
- C08J 3/24 (2006.01)
- C08J 9/30 (2006.01)
- C08K 5/29 (2006.01)
- C09J 11/06 (2006.01)
- C09J 133/04 (2006.01)
- C08L 33/04 (2006.01)
- C09J 7/20 (2018.01)
- C09J 7/10 (2018.01)
- C09J 7/00 (2018.01)
- C08F 220/18 (2006.01)
- B32B 5/18 (2006.01)
- C08J 9/32 (2006.01)

(52) U.S. Cl.
CPC .......... *C08F 220/1802* (2020.02); *C08J 3/24* (2013.01); *C08J 9/30* (2013.01); *C08K 5/29* (2013.01); *C08L 33/04* (2013.01); *C09J 7/00* (2013.01); *C09J 7/10* (2018.01); *C09J 7/20* (2018.01); *C09J 11/06* (2013.01); *C09J 133/04* (2013.01); *B32B 2307/50* (2013.01); *C08J 9/32* (2013.01); *C08J 2201/026* (2013.01); *C08J 2333/08* (2013.01)

(56) References Cited

U.S. PATENT DOCUMENTS

| | | |
|---|---|---|
| 2010/0224316 A1 | 9/2010 | Soejima et al. |
| 2014/0066557 A1 | 3/2014 | Koso |

FOREIGN PATENT DOCUMENTS

| | | | |
|---|---|---|---|
| CN | 103649259 A | | 3/2014 |
| JP | H01115982 A | | 5/1989 |
| JP | 2000177038 A | * | 6/2000 |
| JP | 2000177038 A | | 6/2000 |
| JP | 2003001653 A | | 1/2003 |
| JP | 2006176693 A | | 7/2006 |
| JP | 2009280730 A | | 12/2009 |
| JP | 2016108555 A | | 6/2016 |
| KR | 1020140131478 A | | 11/2014 |

OTHER PUBLICATIONS

Jul. 18, 2018, Extended European Search Report issued by the European Patent Office in the corresponding European Patent Application No. 16764510.0.
Mar. 1, 2016, International Search Report issued in the International Patent Application No. PCT/JP2016/050314.
Sep. 19, 2017, International Preliminary Reporton Patentability issued in the International Patent Application Mo. PCT/JP2016/050314.
Shindo et al., Suction Sheet and Its Applied Article, Jun. 27, 2000, machine translation of JP2000-177038 (Year: 2000).
Suzuki et al., Water Absorbable Foam Having Self-Adhesiveness, Jan. 8, 2003, machine translation of JP2003-001653 (Year: 2003).
Jul. 5, 2018, Office Action issued by U.S. Appl. No. 15/557,490.
Dec. 12, 2018, Office Action issued by U.S. Appl. No. 15/557,490.
May 6, 2019, Office Action issued by U.S. Appl. No. 15/557,490.
Sep. 11, 2019, Office Action issued by U.S. Appl. No. 15/557,490.
Mar. 16, 2020, Office Action issued by U.S. Appl. No. 15/557,490.

* cited by examiner

METHOD FOR PRODUCING A SELF-ADSORBING FOAM SHEET AND METHOD FOR PRODUCING A SELF-ADSORBING LAMINATED FOAM SHEET

CROSS-REFERENCE TO RELATED APPLICATION

This application is a divisional application of U.S. application Ser. No. 15/557,490 filed Sep. 12, 2017, which is a National Stage Application of PCT/JP2016/050314 filed Jan. 7, 2016, which claims priority based on Japanese Patent Application No. 2015-052998 filed Mar. 17, 2015. The disclosures of the prior applications are hereby incorporated by reference herein in their entirety.

TECHNICAL FIELD

The present invention relates to self-adsorbing foam sheets and self-adsorbing laminated foam sheets, methods for producing the same, and resin compositions used for obtaining the same.

BACKGROUND ART

In recent years, self-adsorbing sheet members that are constituted by a foam material having a plurality of microcavities (hereinafter referred to as "self-adsorbing foam sheets") are utilized as adsorbing sheets that are used by being stuck to smooth adsorbed matters such as window glass. Because not pasted but adsorbing to adsorbed matters using microcavities, self-adsorbing foam sheets are easy to be restuck without any remaining glue, and are preferably employed in various uses for building decoration material represented by interior decorative materials such as wallpaper, sticking materials for advertising such as posters and stickers, etc. Generally, base materials such as resin films are laminated to self-adsorbing foam sheets in order to employ the sheets in these uses, and these base materials are decorated by printing, etc. Hereinafter laminated sheets having adsorbing layers consisting of self-adsorbing foam sheets, and supporting layers constituted by base materials will be referred to as "self-adsorbing laminated foam sheet".

Conventionally, resin is used for a foam material composing self-adsorbing foam sheets. Especially, acrylic acid ester copolymers are preferably used in view of being excellent in various mechanical strengths and weatherability. However, acrylic acid ester copolymers including N-methylol groups are often used especially for the purpose of improving strength in wetting, and a melamine crosslinking agent is often used together for the purpose of further improving strength. In a case where acrylic acid ester copolymers including N-methylol groups are used together with a melamine crosslinking agent, formaldehyde is formed a lot in crosslinking, and remains in self-adsorbing foam sheets as well, which causes the appearance of formaldehyde when self-adsorbing foam sheets or self-adsorbing laminated foam sheet are used. Formaldehyde is known as a causative agent of what is called sick house syndromes, and the amount of emission thereof is strongly demanded to be reduced by setting environmental standards, etc. Therefore, it is problematic to use self-adsorbing foam sheets or self-adsorbing laminated foam sheet as described above for wallpaper and the like.

As a technique of reducing the amount of formaldehyde emitted from self-adsorbing foam sheets, for example, Patent Literature 1 discloses making a self-adsorption foamed sheet which does not generate at all or hardly generates formaldehyde, using a resin composition constituted by containing a (meth)acrylate copolymer resin not containing an N-methylol group in the molecule, but containing an oxazoline crosslinking agent.

CITATION LIST

Patent Literature

Patent Literature 1: JP 2006-176693A

SUMMARY OF INVENTION

Technical Problem

In Patent Literature 1, however, the gel fraction of the (meth)acrylate copolymer resin has to be increased in order to obtain a proper self adsorption strength because the (meth)acrylate copolymer resin containing a carboxyl group is used instead of the (meth)acrylate copolymer resin containing an N-methylol group that is conventionally used. As a result, the smoothness of the self-adsorbing foam sheet is sometimes lacked, and both an self adsorption strength and smoothness of the sheet are hard to be compatible.

An object of the present invention is to provide a self-adsorbing foam sheet and a self-adsorbing laminated foam sheet which form almost no formaldehyde, have proper self adsorption strengths, and are excellent in smoothness; methods for producing the same; and a resin compound used for obtaining the same.

Solution to Problem

As a result of inventors' deliberate research in view of the above described problems, they found that properties demanded above can be achieved by combining a predetermined (meth)acrylic acid ester copolymer resin and a carbodiimide crosslinking agent.

That is, a first aspect of the present invention is a resin composition for a self-adsorbing foam sheet, the resin composition comprising: 100 parts by mass of a (meth)acrylic acid ester copolymer resin which includes an N-methylol group, and whose glass transition temperature is $-10°$ C. or less; and 1 to 20 parts by mass of a carbodiimide crosslinking agent.

In this description, "(meth)acrylic" means "acrylic and/or methacrylic".

A second aspect of the present invention is a self-adsorbing foam sheet produced by the process comprising: shaping foam that is obtained by foaming the resin composition according to the above first aspect of the present invention, into a sheet; and after said shaping, carrying out crosslinking reaction on the (meth)acrylic acid ester copolymer resin.

A third aspect of the present invention is a self-adsorbing laminated foam sheet comprising: an adsorbing layer consisting of the self-adsorbing foam sheet according to the above second aspect of the present invention; and a supporting layer consisting of a base material.

A fourth aspect of the present invention is a method for producing a self-adsorbing foam sheet, the method comprising: making a resin composition for a self-adsorbing foam sheet, the resin composition including: 100 parts by mass of a (meth)acrylic acid ester copolymer resin which includes an N-methylol group, and whose glass transition temperature is $-10°$ C. or less; and 1 to 20 parts by mass of a carbodiimide crosslinking agent; foaming the resin composition, to obtain foam of the resin composition; and shaping the foam into a sheet and after that, carrying out crosslinking reaction on the (meth)acrylic acid ester copolymer resin.

A fifth aspect of the present invention is a method for producing a self-adsorbing laminated foam sheet that includes an adsorbing layer consisting of a self-adsorbing foam sheet and a supporting layer consisting of a base material, the method comprising: making a resin composition for a self-adsorbing foam sheet, the resin composition including: 100 parts by mass of a (meth)acrylic acid ester copolymer resin which includes an N-methylol group, and whose glass transition temperature is −10° C. or less; and 1 to 20 parts by mass of a carbodiimide crosslinking agent; foaming the resin composition, to obtain foam of the resin composition; and shaping the foam into a sheet on the base material, and after that, carrying out crosslinking reaction on the (meth)acrylic acid ester copolymer resin, to laminate the adsorbing layer to the supporting layer.

In the first, fourth and fifth aspects of the present invention, preferably, gel fraction of the (meth)acrylic acid ester copolymer resin is 70% or less.

In the third and fifth aspects of the present invention, preferably, the base material is a resin film.

Advantageous Effects of Invention

The present invention can provide a self-adsorbing foam sheet and a self-adsorbing laminated foam sheet which form almost no formaldehyde, have proper self adsorption strengths, and are excellent in smoothness; methods for producing the same;
and a resin compound used for obtaining the same.

DESCRIPTION OF EMBODIMENTS

Hereinafter, embodiments of the present invention will be described. The embodiments described below are exemplifications of the present invention, and the present invention is not limited thereto. In the present invention, the term "film" includes "sheet" and the term "sheet" includes "film" as well.

1. Resin Composition for Self-Adsorbing Foam Sheet

The resin composition for a self-adsorbing foam sheet of the present invention includes 100 parts by mass of a (meth)acrylic acid ester copolymer resin which includes an N-methylol group and whose glass transition temperature is −10° C. or less, and 1 to 20 parts by mass of a carbodiimide crosslinking agent.

<(Meth)acrylic Acid Ester Copolymer Resin>

Hereinafter, the (meth)acrylic acid ester copolymer resin used in the present invention will be described. The (meth)acrylic acid ester copolymer resin includes an N-methylol group, and glass transition temperature thereof is −10° C. or less.

The glass transition temperature of the (meth)acrylic acid ester copolymer resin is −10° C. or less, and preferably −13° C. or less. The glass transition temperature of the (meth)acrylic acid ester copolymer resin is the above described upper limit or less, so that the gel fraction of the (meth)acrylic acid ester copolymer resin described below easily becomes a predetermined upper limit or less. As a result, it is easy to make a self-adsorbing foam sheet and a self-adsorbing laminated foam sheet having proper self adsorption strengths and excellent smoothness. While not specifically provided, the lower limit is preferably −40° C. or more.

The (meth)acrylic acid ester copolymer resin consists of no less than 50% by mass of monomeric units derived from (meth)acrylic acid ester monomers and no more than 50% by mass of monomeric units derived from monomers copolymerizable with the (meth)acrylic acid ester monomers; preferably, no less than 70% by mass of monomeric units derived from (meth)acrylic acid ester monomers and no more than 30% by mass of monomeric units derived from monomers copolymerizable with the (meth)acrylic acid ester monomers; more preferably, no less than 80% by mass of monomeric units derived from (meth)acrylic acid ester monomers and no more than 20% by mass of monomeric units derived from monomers copolymerizable with the (meth)acrylic acid ester monomers; and further preferably, no less than 85% by mass of monomeric units derived from (meth)acrylic acid ester monomers and no more than 15% by mass of monomeric units derived from monomers copolymerizable with the (meth)acrylic acid ester monomers. The content of monomeric units derived from (meth)acrylic acid ester monomers within the above described range makes it possible for the resin to acquire a proper adhesive property.

In the present invention, an N-methylol group that the (meth)acrylic acid ester copolymer resin includes is included in a monomeric unit copolymerizable with (meth)acrylic acid ester monomers, and may be included in a monomeric unit of (meth)acrylic acid ester as well.

(Meth)acrylic acid ester monomers applicable to the present invention are not limited, and preferably, units of (meth) acrylic acid ester monomers composing homopolymers of −20° C. or below in glass transition temperature are contained in view of easily making the glass transition temperature of the (meth)acrylic acid ester copolymer resin −10° C. or below.

Non-limiting examples of the above described (meth) acrylic acid ester monomers composing homopolymers of −20° C. or below in glass transition temperature include alkyl (meth)acrylates composing homopolymers of −20° C. or below in glass transition temperature such as: ethyl acrylate (homopolymers therefrom are −24° C. in glass transition temperature. Hereinafter the same will be indicated in parentheses), n-propyl acrylate (−37° C.), n-butyl acrylate (−54° C.), sec-butyl acrylate (−22° C.), n-heptyl acrylate (−60° C.), n-hexyl acrylate (−61° C.), n-octyl acrylate (−65° C.), 2-ethylhexyl acrylate (−50° C.), n-octyl methacrylate (−25° C.), n-decyl methacrylate (−49° C.); and alkoxyalkyl (meth)acrylates composing homopolymers of −20° C. or below in glass transition temperature such as: 2-methoxyethyl acrylate (−50° C.), 3-methoxypropyl acrylate (−75° C.), 3-methoxybutyl acrylate (−56° C.), and ethoxymethyl acrylate (−50° C.). Among them, alkyl (meth) acrylates composing homopolymers of −20° C. or below in glass transition temperature and alkoxyalkyl (meth)acrylates composing homopolymers of −20° C. or below in glass transition temperature are preferable, and alkyl (meth)acrylates composing homopolymers of −20 ° C. or below in glass transition temperature are more preferable.

If glass transition temperature of the (meth)acrylic acid ester copolymer resin can be regulated to −10° C. or below, methyl acrylate (homopolymers are 10° C. in glass transition temperature. Hereinafter the same will be indicated in parentheses), methyl methacrylate (105° C.), ethyl methacrylate (63° C.), n-propyl methacrylate (25° C.), n-butyl methacrylate (20° C.) or the like may be used.

Only one kind of the above described (meth)acrylic acid ester monomers may be used. Alternatively, two or more kinds thereof may be used together.

It is necessary to use a monomer including an N-methylol group such as N-methylolacrylamide and N-methylolmethacrylamide as each monomer copolymerizable with (meth) acrylic acid ester monomers (hereinafter referred to as "a monomer for copolymerization"). Use of a monomer including an N-methylol group easily makes the gel fraction, which will be described later, a predetermined upper limit or below, and as a result, makes it easy to produce the self-adsorbing foam sheet and the self-adsorbing laminated foam sheet having proper self adsorption strengths, and excellent smoothness. In the above described view, the proportion of the use of monomers including N-methylol groups is as follows: monomeric units derived from monomers including N-methylol groups are preferably 0.1% to 10% by mass, and more preferably 0.5% to 5% by mass when the (meth)acrylic acid ester copolymer resin is 100% by mass.

In addition to the above described monomer including an N-methylol group, another kind of a monomer may be used together as a monomer for copolymerization. Such another kind of a monomer is not limited as allowing glass transition temperature of the (meth)acrylic acid ester copolymer resin to be −10° C. or below. Specific examples thereof include α,β-ethylenically unsaturated polyvalent carboxylic acid complete esters, alkenyl aromatic monomers, vinyl cyanide monomers, esters of carboxylic acids and unsaturated alcohols, olefinic monomers, and other monomers including functional groups. Only one kind of these monomers may be used, or two or more kinds thereof may be used together.

Specific examples of α,β-ethylenically unsaturated polyvalent carboxylic acid complete esters include dimethyl fumarate, diethyl fumarate, dimethyl maleate, diethyl maleate, and dimethyl itaconate.

Specific examples of alkenyl aromatic monomers include styrene, α-methylstyrene, methyl α-methylstyrene, and vinyltoluene.

Specific examples of vinyl cyanide monomers include acrylonitrile, methacrylonitrile, α-chloroacrylonitrile, and α-ethylacrylonitrile.

Specific examples of esters of carboxylic acids and unsaturated alcohols include vinyl acetate.

Specific examples of olefinic monomers include ethylene, propylene, butene, and pentene.

Monomers including functional groups may be used as monomers for copolymerization for the purpose of efficient crosslinking inside or between copolymers.

Examples of a functional group mentioned herein include an organic acid group, a hydroxyl group, an amino group, an amide group, a mercapto group, and an epoxy group.

Monomers including organic acid groups are not limited, and representative examples thereof include monomers including organic acid groups such as carboxyl groups, acid anhydride groups, and sulfonic acid groups. Other than them, monomers containing sulfenic acid groups, sulfinic acid groups, and phosphoric acid groups can be used as well.

Specific examples of monomer including carboxyl groups include α,β-ethylenically unsaturated monocarboxylic acids such as acrylic acid, methacrylic acid, and crotonic acid; α,β-ethylenically unsaturated polyvalent carboxylic acids such as itaconic acid, maleic acid, and fumaric acid; and in addition, α,β-ethylenically unsaturated polyvalent carboxylic acid partial esters such as monomethyl itaconate, monobutyl maleate, and monopropyl fumarate. Monomer including groups from which carboxyl groups can be derived by hydrolysis etc., such as maleic anhydride, and itaconic anhydride, can be used as well.

Specific examples of monomers including sulfonic acid groups include α,β-unsaturated sulfonic acids such as allylsulfonic acid, methallylsulfonic acid, vinylsulfonic acid, styrenesulfonic acid, and acrylamido-2-methylpropane sulfonic acid; and salts thereof In a case where monomers including organic acid groups are used, these monomers are subjected to polymerization so that the amount of monomeric units derived therefrom is preferably 0.1% to 20% by mass, and more preferably 0.5% to 15% by mass when the (meth)acrylic acid ester copolymer resin is 100% by mass. The amount of the use of the monomers including organic acid groups within the above described range makes it easy to keep the viscosity of polymerization systems in polymerization within a proper range, and to prevent self-adsorption of the self-adsorbing foam sheet and the self-adsorbing laminated foam sheet from being lost due to excessive progress of crosslinking of copolymers.

Monomeric units including organic acid groups are easy and preferable to be introduced into the (meth)acrylic acid ester copolymer resin according to polymerization of monomers including organic acid groups. Organic acid groups may be introduced according to a known polymer reaction after the (meth)acrylic acid ester copolymer resin is made.

Examples of monomers including hydroxyl groups include hydroxy alkyl(meth)acrylic acid esters such as 2-hydroxyethyl (meth)acrylate, and 3-hydroxypropyl (meth) acrylate.

Examples of monomers including amino groups include N,N-dimethylaminomethyl (meth)acrylate, N,N-dimethylaminoethyl (meth)acrylate, and aminostyrene.

Examples of monomers including amide groups include α,β-ethylenically unsaturated carboxylic acid amide monomers such as acrylamide, methacrylamide, and N,N-dimethylacrylamide.

Examples of monomers including epoxy groups include glycidyl(meth)acrylate, and allyl glycidyl ether.

In a case where these monomers including functional groups other than organic acid groups are used, these monomers are preferably used for polymerization so that the amount of monomeric units derived therefrom is no more than 10% by mass when the (meth)acrylic acid ester copolymer resin is 100% by mass. The amount of the use of monomers including functional groups other than organic acid groups is no more than 10% by mass, so that the viscosity of polymerization systems in polymerization can be easily kept within a proper range, and a self-adsorbing property of the self-adsorbing foam sheet and the self-adsorbing laminated foam sheet can be easily prevented from being lost due to excessive progress of crosslinking of copolymers.

A polyfunctional monomer having a plurality of polymerizable unsaturated bonds may be used together as a monomer for copolymerization. An unsaturated bond-terminated polyfunctional monomer is preferable. Using such a polyfunctional monomer makes it possible to introduce intramolecular and/or intermolecular crosslinking into the (meth)acrylic acid ester copolymer resin, to improve a cohesive force.

Examples of the above described polyfunctional monomer include polyfunctional (meth)acrylates such as: 1,6-hexanediol di(meth)acrylate, 1,2-ethylene glycol di(meth) acrylate, 1,12-dodecanediol di(meth)acrylate, polyethylene glycol di(meth)acrylate, polypropyleneglycol di(meth)acrylate, neopentylglycol di(meth)acrylate, pentaerythritol di(meth)acrylate, trimethylolpropane tri(meth)acrylate, pentaerythritol tri(meth)acrylate, ditrimethylolpropane tri (meth)acrylate, pentaerythritol tetra(meth)acrylate, and dipentaerythritol hexa(meth)acrylate; substituted triazines such as 2,4-bi s(trichloromethyl)-6-p-methoxystyrene-5-triazine; and in addition, mono-ethylenically unsaturated aromatic ketones such as 4-acryloxybenzophenone. Polyfunctional (meth)acrylates are preferable, and pentaerythritol di(meth)acrylate, pentaerythritol tri(meth)acrylate, and pentaerythritol tetra(meth)acrylate are more preferable. Only one kind of these polyfunctional monomers may be used, or two or more kinds thereof may be used together.

The (meth)acrylic acid ester copolymer resin can be obtained by copolymerization of (meth)acrylic acid ester monomers and monomers for copolymerization. Any of polymerization methods such as solution polymerization, emulsion polymerization, suspension polymerization, bulk polymerization, and any other methods may be used when the (meth)acrylic acid ester copolymer resin is obtained. Types and amounts of a polymerization initiator, an emulsifying agent, a dispersing agent and the like that are used for polymerization are not limited as well. A method of adding monomers, a polymerization initiator, an emulsifying agent, a dispersing agent and the like upon polymerization are not limited as well. Also, there is no limitation on polymerization temperature, pressure, stirring conditions and the like.

The (meth)acrylic acid ester copolymer resin may be either solid or a dispersion. If an emulsion or dispersion obtained from emulsion polymerization or dispersion polymerization is used as it is, operation is easy in mixing with a crosslinking agent and conductive compounds, and it is convenient to foam the obtained emulsion or dispersion.

The gel fraction of the (meth)acrylic acid ester copolymer resin is preferably 70% or less, and more preferably 65% or less. The gel fraction within the above range makes it easy to produce the self-adsorbing foam sheet and the self-adsorbing laminated foam sheet of proper self adsorption strengths, and excellent smoothness.

The gel fraction in the present invention is a value obtained from the following formula after: in 100 ml of ethyl acetate, 500 mg of a sample of an acrylic acid ester copolymer resin is immersed at normal temperature for 3 days; after that insoluble matters are filtered through woven metal of 200 mesh, and air-dried at normal temperature for 15 hours; after that the resulting matters are dried at 100° C. for 2 hours, and a dry mass of the resulting insoluble content is measured.

Gel fraction (% by mass)=((a dry mass of the insoluble content after the immersion in ethyl acetate)/(a mass of the sample before the immersion in ethyl acetate))×100

<Carbodiimide Crosslinking Agent>

The carbodiimide crosslinking agent used in the present invention is not restricted. A compound where two or more carbodiimide groups are included in one molecule is preferably used. A known carbodiimide compound can be used as such a compound.

Either synthesized or commercially available carbodiimide compound may be used as a known carbodiimide compound described above. Examples of a commercially available carbodiimide compound include "DICNAL HX" from DIC Corporation, and "CARBODILITE" from Nisshinbo Chemical Inc. When a carbodiimide compound is synthesized, for example, a polycarbodiimide compound that is a carbodiimidized polyisocyanate by decarboxylative condensation reaction in the presence of a carbodiimidization catalyst can be used.

Examples of a raw material that is a polyisocyanate include hexamethylene diisocyanate (HDI), hydrogenated xylylene diisocyanate (H6XDI), xylylene diisocyanate (XDI), 2,2,4-trimethylhexamethylene diisocyanate (TMHDI), 1,12-diisocyanatedecane (DDI), norbornane diisocyanate (NBDI), and 2,4-bis-(8-isocyanateoctyl)-1,3-dioctylcyclobutane (OCDI), 4,4'-dicyclohexylmethane diisocyanate (HMDI), tetramethylxylylene diisocyanate (TMXDI), isophorone diisocyanate (IPDI), 2,4,6-triisopropylphenyldiisocyanate (TIDI), 4,4'-diphenylmethane diisocyanate (MDI), tolylene diisocyanate (TDI), and hydrogenated tolylene diisocyanate (HTDI). A carbodiimide compound can be synthesized by: stirring and mixing a polyisocyanate within the range of 0 to 200° C. for any length of time in the presence of an air flow or bubbling of an inert gas; after that adding the resultant along with a carbodiimidization catalyst, and stirring and mixing them.

Here, preferably, carbodiimidization catalyst described above is an organophosphorus compound. Specifically, phospholene oxides are preferable in view of activity. Specific examples thereof include 3-methyl-1-phenyl-2-phospholene-1-oxide, 3-methyl-1-ethyl-2-phospholene-1-oxide, 1,3 -dimethyl-2-phospholene-1-oxide, 1-ethyl-2-phospholene-1-oxide, 1-methyl-2-phospholene-1-oxide and double bond isomers thereof.

The carbodiimide crosslinking agent forms an intramolecular or intermolecular crosslinking structure of the (meth) acrylic acid ester copolymer resin according to reaction of carbodiimide groups thereof with N-methylol groups in the (meth)acrylic acid ester copolymer resin. The carbodiimide crosslinking agent is excellent especially in a crosslinking effect at low temperature. The carbodiimide crosslinking agent is preferable because being able to form the self-adsorbing foam sheet excellent in strength and a self-adsorbing property.

Both the carbodiimide crosslinking agent and a crosslinking agent other than the carbodiimide crosslinking agent (examples thereof include: epoxy resins such as poly(ethylene glycol) diglycidyl ether, glycerin polyglycidyl ether, sorbitol polyglycidyl ether, and bisphenol A polyglycidyl ether; aziridines such as ethylenimine derivatives including aldehyde and acrolein; multifunctional isocyanate crosslinking agents such as tolylene diisocyanate, trimethylolpropane tolylene diisocyanate, and diphenylmethane triisocyanate; oxazoline crosslinking agents; metal salt-based crosslinking agents; metal chelate-based crosslinking agents; and peroxide-based crosslinking agents) can be used together. Preferably, crosslinking agents that cause formaldehyde to form, such as aldehyde resins including melamine-formaldehyde resins, urea-formaldehyde resins, and phenolformaldehyde resins are not used.

The amount of the use of the carbodiimide crosslinking agent is preferably 0.5 to 20 parts by mass, and more preferably 2 to 15 parts by mass as a solid, to 100 parts by mass of the (meth)acrylic acid ester copolymer resin. The amount of the use of the carbodiimide crosslinking agent is within the above described range so that the resin is allowed to have a proper self adsorption strength, and strength of the resin after crosslinking can be improved.

(Other Additives)

The resin composition for a self-adsorbing foam sheet of the present invention can makes it possible to make the amount of emission of formaldehyde extremely low without containing any formaldehyde scavengers. However, this resin composition may further contain a formaldehyde scavenger.

A formaldehyde scavenger that can be used for the present invention is not limited as long as being a compound that physically adsorbs formaldehyde or that can chemically react with formaldehyde. This formaldehyde scavenger may be either inorganic compound or organic compound that includes even polymers.

Specific examples of a formaldehyde scavenger include nitrogen-containing compounds such as: hydroxylamine sulfate, hydroxylamine hydrochloride, ammonium acetate, urea, ethyleneurea, dicyandiamide, polyamide resins, triazine compounds, and hydrazide compounds; halogen oxides such as stabilized chlorine dioxide; and metallic salts such as disodium hydrogen phosphate, zinc sulfate, calcium chloride, and magnesium sulfate. Among them, nitrogen-containing compounds are preferable and hydroxylamine sulfate is more preferable in view of easy availability, operability and scavenging of formaldehyde. These formaldehyde scavengers may be used individually or may be used in combination.

The resin composition for a self-adsorbing foam sheet of the present invention may contain various additives if necessary in order to improve processability in the processes of producing the self-adsorbing foam sheet and the Self-adsorbing Laminated Foam Sheet, and to improve properties of the self-adsorbing foam sheet and self-adsorbing laminated foam sheet to be obtained.

Examples of additives include foam stabilizers, auxiliary blowing agents, thickeners, fillers, antiseptics, fungicides, gelatinizers, flame retardants, anti-aging agents, antioxidants, pigments, dyes, tackifiers, and conductive compounds.

As foam stabilizers, the following can be used: ammonium salts of fatty acids such as ammonium stearate, sulfonic acid-type anionic surfactants such as alkyl sulfosuccinates, quaternary alkylammonium chlorides, amphoteric compounds of alkyl betaines, and alkanolamine salts of fatty acids.

As auxiliary blowing agents, the following can be used: sodium lauryl sulfate, sodium alkyl diphenyl ether disulphonate, and sodium polyoxyethylene alkylphenol ether sulfate.

As thickeners, the following can be used: acrylic polymer particles, inorganic compounds particulates such as fine silica particles, and reactive inorganic compounds such as magnesium oxide.

As fillers, the following can be used: calcium carbonate, magnesium carbonate, aluminum hydroxide, magnesium hydroxide, barium hydroxide, clay, kaolin, and glass powder.

Examples of antiseptics and fungicides include dihydroxy dichlorophenylmethane, sodium pentachlorophenate, 2,3,4,6-tetrachloro-4-(methylsulfonyl)pyridine, 2,3,5,6-tetrachloro-4-(methylsulfonyl)pyridine, bis(tributyltin) oxide, hexahydro-1,3,5-triethyl-s-triazine, silver complexes, and zinc complexes.

As gelatinizers, the following can be used: ammonium salts such as ammonium acetate, ammonium chloride, and ammonium carbonate; alkylphenol alkylene oxide addition products, polyvinylmethyl ether, polypropylene glycol, polyether polyformal, methylcellulose, hydroxyethyl cellulose, and silicone heat sensitizers.

As flame retardants, the following can be used: phosphoric acid ester compounds, halogen phosphoric acid ester compounds, ammonium polyphosphate, antimony trioxide, zinc borate, barium metaborate, ammonium hydroxide, magnesium hydroxide, tin compounds, organophosphorous compounds, red phosphorus compounds, and silicone flame retardants.

Antioxidants based on polyphenol, hydroquinone, hindered amine, and the like can be used.

Examples of pigments and dyes include titan oxide, carbon black, iron oxide red, and quinacridone.

As tackifiers, any compounds selected from the following can be used: rosin resins such as gum rosins, tall oil rosins, wood rosins, hydrogenated rosins, disproportionated rosins, polymerized rosins, maleated rosins, rosin glycerol esters, and hydrogenated rosin glycerol esters; terpene based resins such as terpene resins, terpene phenol resins, and aromatic modified terpene resins; petroleum resins such as aliphatic petroleum resins, alicyclic petroleum resins, and aromatic petroleum resins; coumarone-indene resins; terpene phenol-based resins; phenol resins; hydrogenated rosin esters; disproportionated rosin esters; and xylene resins.

2. Self-adsorbing Foam Sheet and Self-Adsorbing Laminated Foam Sheet

The self-adsorbing foam sheet of the present invention is produced by shaping foam that is obtained by foaming the resin composition of the present invention, into a sheet, and after said shaping, carrying out crosslinking reaction on the (meth)acrylic acid ester copolymer resin.

The self-adsorbing laminated foam sheet of the present invention has an adsorbing layer consisting of the self-adsorbing foam sheet of the present invention; and a supporting layer consisting of a base material.

Specific examples of the base material used for the self-adsorbing laminated foam sheet include paper bases, synthetic paper, and plastic sheets.

Here, examples of paper bases include woodfree paper, art paper, coated paper, kraft paper, and laminated paper obtained by laminating a thermoplastic resin such as polyethylene to paper bases. Synthetic paper is obtained by combining a thermoplastic resin with an inorganic filler, to form its outermost layer to be paper.

In contrast, examples of plastic sheets include polyester resins such as polyethylene terephthalate, and polyethylene naphthalate; polystyrene resins; polyvinyl chloride resins; acrylic resins; polycarbonate resins; polyamide resins; fluorocarbon polymers such as polytetrafluoroethylene; and sheets composed of mixtures or laminates thereof.

Thickness of the supporting layer consisting of the base material is not limited. Normally, the thickness thereof is 10 µm to 200 µm.

If the base material having releasability is employed, the base material can be released after the adsorbing layer consisting of the self-adsorbing foam sheet is formed on the base material as described later, to be used as the self-adsorbing foam sheet.

3. Producing Method

Hereinafter the method for producing the self-adsorbing foam sheet and the self-adsorbing laminated foam sheet will be described.

Figure 1:
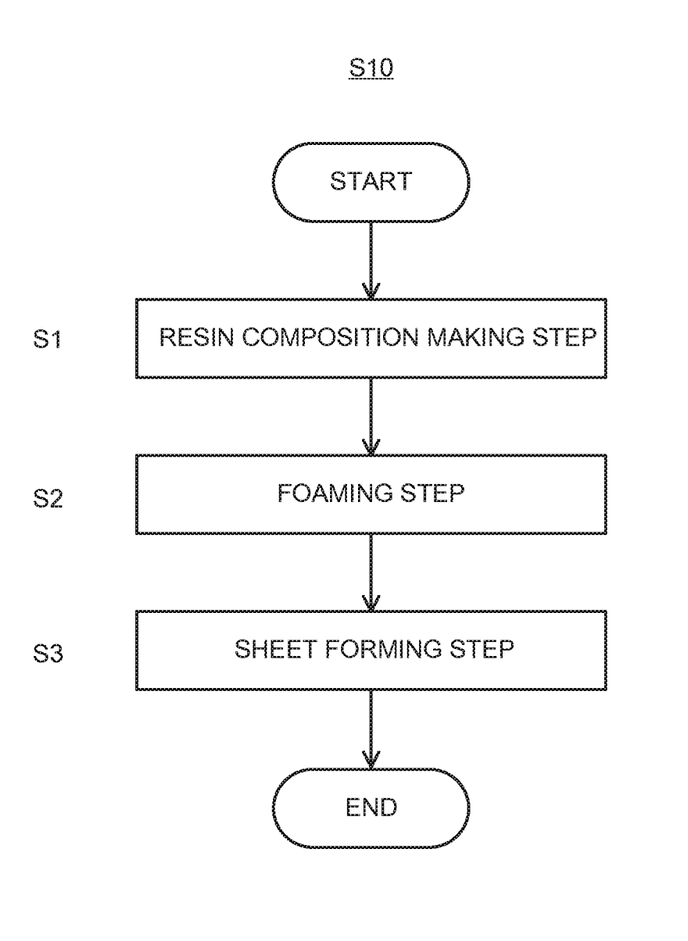
FIG. 1 is an exemplary flowchart of one embodiment of the method for producing a self-adsorbing foam sheet according to the present invention.

FIG. 1 is an exemplary flowchart of the self-adsorbing foam sheet producing method S10 of the present invention (hereinafter may be abbreviated as "this producing method S10"). As shown in FIG. 1, this producing method S10 includes a resin composition making step S1, a foaming step S2 and a sheet forming step S3 in this order. Hereinafter each step will be described.

(Resin Composition Making Step S1)

The resin composition making step S1 is a step of making a resin composition for a self-adsorbing foam sheet, the resin composition including: 100 parts by mass of a (meth)acrylic acid ester copolymer resin which includes an N-methylol group, and whose glass transition temperature is −10° C. or less; and 1 to 20 parts by mass of a carbodiimide crosslinking agent.

In the resin composition making step S1, the resin composition for the self-adsorbing foam sheet can be made by mixing: (meth)acrylic acid ester copolymer resin including N-methylol groups, which are essential component, of −10° C. or below in glass transition temperature; a carbodiimide crosslinking agent; and other components used if desired, according to some method. Each substance used in this step, the proportion of the use thereof, etc. are as described above, and thus the description thereof is omitted here.

In case of being an emulsion or a dispersion, the (meth) acrylic acid ester copolymer resin can be easily mixed with the carbodiimide crosslinking agent and the other components only by adding them to the resin in a state of an aqueous dispersion, a water solution, or the like during stirring.

In a case where the (meth)acrylic acid ester copolymer resin is a solid, a way of mixing is not restricted as well. For example, mixing may be carried out with rolls, Henschel mixers, or kneaders. Either batch mixing or continuous mixing may be carried out.

Examples of batch mixers include kneaders and stirrers for high viscosity materials such as: mortar machines, kneaders, internal mixers, and planetary mixers. Examples of continuous mixers include Farrel continuous mixers that are combinations of rotors and screws, and kneaders of special structures like screw type kneaders. Single-screw extruders and twin-screw extruders that are used for extruding are also included. These extruders and kneaders may be used in combination, or a plurality of machine of the same type may be coupled to be used.

A form of the resin composition for a self-adsorbing foam sheet of the present invention is not limited. The resin composition in the form of either emulsion or dispersion makes it convenient to obtain the self-adsorbing foam sheet.

The viscosity of this emulsion or dispersion is preferably 2000 to 10000 mPa·s, and more preferably 3500 to 5500 mPa·s.

(Foaming Step S2)

The foaming step S2 is a step of foaming the resin composition, to obtain foam of the resin composition.

In the foaming step 2, the resin composition for a self-adsorbing foam sheet, which is made in the resin composition making step S1, is foamed, which makes it possible to obtain foam in an unsolidified state. In a case where the resin composition for a self-adsorbing foam sheet is in the form of an emulsion or dispersion, a foamed emulsion or foamed dispersion is obtained.

Generally, mechanical foaming is employed as a foaming method. Foaming magnification may be properly adjusted, is generally 1.2 to 5 times, and is preferably 1.5 to 4 times. A method of mechanical foaming is not restricted. This mechanical foaming can be carried out by mixing a certain amount of air with an emulsion of the resin composition, and stirring the mixture with a continuous or batch type Oakes mixer, whipper, or the like. A foamed emulsion obtained according to this way is creamy.

Instead of the above described mechanical foaming, the foaming resin composition can be also prepared with, for example, the method of using a proper synthetic resin such as vinylidene chloride copolymers as a shell wall, and adding thermally expandable microcapsules that encompass hydrocarbon compounds of low boiling points to an acrylic resin emulsion or butadiene synthetic rubber emulsion.

(Sheet Forming Step S3)

The sheet forming step S3 is a step of shaping the foam into a sheet and after that, carrying out crosslinking reaction on the (meth)acrylic acid ester copolymer resin.

In the sheet forming step S3, a method of shaping the foam into a sheet is not restricted, and preferred examples thereof include: the method of coating, with the foam, process paper such as a polyester film on which a releasing process is carried out, to shape the foam into a sheet.

The following coating devices, which are generally known, can be used for a method of coating process paper with the foam: roll coaters, reverse roll coaters, screen coaters, doctor knife coaters, comma knife coaters, etc. Specifically, uniform coating thickness can be obtained using doctor knife coaters.

The self-adsorbing foam sheet that is made by solidification of the sheet foam can be formed over process paper by crosslinking reaction of the (meth)acrylic acid ester copolymer resin after the foam is shaped into a sheet as described above. At this time, if process paper having releasability is used, the self-adsorbing foam sheet can be easily separated from this process paper.

When the self-adsorbing laminated foam sheet is produced, the self-adsorbing laminated foam sheet can be formed over the base material in the sheet forming step S3 by using the above described base material as process paper, and the self-adsorbing laminated foam sheet including the adsorbing layer consisting of the self-adsorbing foam sheet, and the supporting layer consisting of the base material can be produced.

In the sheet forming step S3, preferably heating and drying is carried out when the (meth)acrylic acid ester copolymer resin is subjected to crosslinking reaction. A method of heating and drying is not restricted as long as the foamed emulsion with which process paper is coated can be dried and crosslinked. Ordinary ovens with hot air circulation, hot air chambers with hot oil circulators, far infrared ray heater chambers, etc. can be used for this method. Drying temperature is properly 60° C. to 180° C. Drying conditions can be properly selected according to the properties of the emulsion, the coating amount, the coating thickness, etc. Preferably, multi-stage drying is carried out such that: drying is carried out from the inside at lower temperature at the early stage, to the entire at higher temperature at the later stage, but not carried out at fixed temperature at all the stages.

Density, thickness, hardness, etc. of the obtained self-adsorbing foam sheet are adjusted according to the mixing ratio of air bubbles, the formation of the resin composition for a self-adsorbing foam sheet, the solid concentration, conditions of solidifying by heating and drying, etc. The thickness of the self-adsorbing foam sheet is preferably 0.03 to 3 mm, more preferably 0.05 to 1 mm, and especially preferably 0.05 to 0.5 mm. If the thickness is thinner than 0.03 mm, the impact absorbency is poor, and retention of items, and functions of protecting surfaces of items are not enough, in a case where the self-adsorbing foam sheet of the present invention is used as an item retention material or an item surface protection material. If the thickness is thicker than 3 mm, the strength of the self-adsorbing foam sheet is poor, which is not preferable as well.

The density of the self-adsorbing foam sheet is not restricted, and is preferably 0.1 to 1.0 $g/cm^3$ in view of impact absorbency.

The self-adsorbing foam sheet or the self-adsorbing laminated foam sheet obtained in the sheet forming step S3 is usually wound by a winder after a separator film is stuck on its surface having a self-adsorbing property, and cut by press cutting, with a slitter, etc., to be processed to a usable size.

4. Uses

Examples of printing that is able to be carried out on the surface of the base material of the self-adsorbing laminated foam sheet of the present invention include: offset printing, seal printing, flexographic printing, silkscreening, gravure printing, and printing with laser printers, thermal transfer printers, ink jet printers, or the like.

The self-adsorbing laminated foam sheet on the surface of the base material on which printing is carried out can be used as building decoration material, sticking materials for advertising, stationary, or materials for toys. Examples of the uses include cards for sales promotion, what is called POP cards (posters, stickers, and displays), underlays (place mats, table mats and pencil boards), menus for fast food restaurants serving hamburgers, sushi, and yakisoba, catalogues, panels, plates (substitutions for metal plates), bromides, price lists for in-shop display, information boards, (store directories, direction and/or destination directories, sweets and/or groceries), POPs for gardening (plant labels), road signs (for funerals and/or housing display parks), display boards (displaying "keep out", operation on forestry roads, etc.), calendars (with images), simple whiteboards, mouse pads, coasters, printed matters that are substitutions for those made with label printers, and adhesive labels.

The self-adsorbing foam sheet and the self-adsorbing laminated foam sheet of the present invention are excellent in releasability. Thus, part of the sheet does not remain in the side of a protected item after released. Therefore, the sheet can be preferably used as an item surface protection material or an item retention material that is directed to various optical components, precision components, etc.

The self-adsorbing foam sheet and the self-adsorbing laminated foam sheet of the present invention emits extremely a small amount of formaldehyde even if emitting it. The amount of emission of formaldehyde can be even less than the detection limit (for example, less than 0.1 ppm) by proper setting of the formation of the resin composition for a self-adsorbing foam sheet. Thus, the sheet of the present invention is preferably employed for places and uses where generation of formaldehyde is inhibited or not preferable. That is, the self-adsorbing foam sheet and self-adsorbing laminated foam sheet of the present invention are preferably used as building interior decoration material, stationary, or materials for toys.

EXAMPLES

The present invention will be described in more detail below. The present invention is not restricted to Examples. "Parts" and "%" used below will be by mass unless otherwise specified.

[Material Properties]

<Measurement of Glass Transition Temperature (Tg) of Acrylic Acid Ester Copolymer Resin>

The glass transition temperature (Tg) of acrylic acid ester copolymer resin that is used for a material of a self-adsorbing laminated foam sheet described below was measured with the following method: 50 μm of a polyethylene terephthalate film in thickness was coated with the acrylic acid ester copolymer resin with a 250 μm applicator, and was dried at normal temperature for 24 hours, to obtain a resin film; and using this film as a sample, the glass transition temperature (° C.) was measured at −50° C. to 160° C. in measurement temperature at 10° C./min in heating rate with a differential scanning calorimeter (DSC6220 from SII NanoTechnology Inc.), conforming to JIS (Japanese Industrial Standards) K7121. The results are shown in Table 1.

<Measurement of Gel Fraction of Acrylic Acid Ester Copolymer Resin>

The gel fraction of the acrylic acid ester copolymer resin used for a self-adsorbing laminated foam sheet that was made as described later was measured with the following method: 50 μm of a polyethylene terephthalate film in thickness was coated with the acrylic acid ester copolymer resin with a 250 μm applicator, and dried at normal temperature for 24 hours, to obtain a resin film; a certain amount (X) (approximately 500 mg) of this film as a sample was precisely weighed, and was immersed in 100 ml of ethyl acetate at normal temperature for 3 days; after that insoluble was filtered through a woven metal of 200 mesh, and air-dried at normal temperature for 15 hours; after that the insoluble matters were dried at 100° C. for 2 hours, and cooled at normal temperature; and after that, the mass of the sample (Y) was measured. The gel fraction was calculated by substitution of the values of X and Y into the following formula. The results are shown in Table 1.

Gel Fraction(%)=(Y)/(X)×100

[Evaluation Categories]

<Self Adsorption Strength>

After the self-adsorbing laminated foam sheet was made as described later, a test piece that was cut out into a size of 125 mm×25 mm was prepared. An adsorbing face of the test piece was stuck onto a glass board of a smooth surface, and the test piece was contact-bonded with a 2 kgf loading roller, and allowed to stand at 23° C. and 50% RH for 1 hour. After that, an end of the test piece was fixed to an upper chuck of an Autograph (AG-IS from Shimadzu Corporation), the glass board was fixed to a lower chuck thereof, and a 180° peeling test was carried out at 300 mm/min in speed at 23° C. at 50% RH. Test strength at this time was defined as an self adsorption strength (N/cm). The results are shown in Table 1. In a case where the result according to this evaluation was 0.01 to 1 N/cm, it could be said to have a proper self adsorption strength.

<Formaldehyde Dissipation Evaluation>

After the self-adsorbing laminated foam sheet was made as described later and further a separator film was stuck onto the surface of the adsorbing layer, a test piece that was cut out into a size of 200 mm×200 mm was prepared. The test piece was put into a tedlar bag of 5 L in volume, and the bag was hermetically sealed. Air of 2 L was encapsulated in the bag, and allowed to stand for 6 hours in a constant temperature oven at 23° C. at 50% RH, and after that, the concentration of formaldehyde in the bag was measured with a detector tube (No. 91L from Gastec Corporation). The results are shown in Table 1, where a case where the concentration of formaldehyde was 0.2 ppm or below is indicated by "∘", and a case where the concentration of formaldehyde was beyond 0.2 ppm is indicated by "×".

<Glossiness (at 60°)>

Glossiness of the surface of the adsorbing layer was measured using a gloss meter (GP-60A from Tokyo Denshoku. Co., Ltd.), conforming to JIS Z 8741. The results are shown in Table 1. In a case where the result according to this evaluation was 35 or more, it could be said that the surface of the sheet was excellent in smoothness.

[Making Self-Adsorbing Laminated Foam Sheet]

Example 1

Into a mixing vessel, 100 parts of an n-methylol group containing acrylic acid ester copolymer resin (I) in terms of solid content, 3.6 parts of a carbodiimide crosslinking agent (DICNAL HX from DIC Corporation) in terms of solid content, and 4.2 parts of a titanium oxide water dispersant (DISPERSE WHITE HG-701 from DIC Corporation) in terms of solid content were added, and stirred with a disperser (composition of (I) was: 46.9 of a copolymer resin of ethyl acrylate/45.8 of butyl acrylate/5.9 of acrylonitrile/ 1.4 of N-methylolacrylamide; its glass transition temperature was −25.9° C.; and its gel fraction was 43.1%). Next, while continuing to be stirred, 2 parts of a thickener (carboxylic acid-modified acrylic acid ester polymers. ARON B-300K from Toagosei Co., Ltd.) in terms of solid content and 4.1 parts of a foam stabilizer [a 1/1 mixture of: a mixture of amphoteric compounds of alkyl betaines and fatty acid alkanolamides (DICNAL M-20 from DIC Corporation)/ sulfonic acid-type anionic surfactants (DICNAL M-40 from DIC Corporation)] in terms of solid content were added thereto in this order, and filtered through 150 mesh. Lastly, ammonia was added thereto, to adjust the viscosity to 4500 mPa·s, and a foamed resin composition was obtained.

This foamed resin composition was stirred with a beater, to be whipped so that foaming magnification was twice. Further, stirring was continued for 5 minutes at a lower stirring speed.

The obtained foamed mixture was applied onto a base material (a polyethylene terephthalate film of 50 μm in thickness) using a 0.3 mm applicator. The resultant was put into a drying oven, and kept at 80° C. for 1.33 minutes; at 120° C. for 1.33 minutes; and at 140° C. for 1.33 minutes, to be subjected to dry crosslinking. An adsorbing layer (a self-adsorbing foam sheet) was laminated to the base material, and the self-adsorbing laminated foam sheet according to Example 1 was obtained.

Example 2

A sheet according to Example 2 was made in the same manner as in Example 1 except using a carbodiimide crosslinking agent (CARBODILITE (registered trademark) E-02 from Nisshinbo Chemical Inc.) instead of the carbodiimide crosslinking agent (DICNALHX from DIC Corporation) used in Example 1.

Example 3

A sheet according to Example 3 was made in the same manner as in Example 1 except using an N-methylol group containing acrylic acid ester copolymer resin (II) whose composition was modified from that of the N-methylol group containing acrylic acid ester copolymer resin (I), so as to have glass transition temperature of −17.6° C. and gel fraction of 28.0%.

Example 4

A sheet according to Example 4 was made in the same manner as in Example 1 except using an N-methylol group containing acrylic acid ester copolymer resin (III) whose composition was modified from that of the N-methylol group containing acrylic acid ester copolymer resin (I), so as to have glass transition temperature of −10.1° C. and gel fraction of 42.2%.

Example 5

A sheet according to Example 5 was made in the same manner as in Example 1 except using an N-methylol group containing acrylic acid ester copolymer resin (IV) whose composition was modified from that of the N-methylol group containing acrylic acid ester copolymer resin (I), so as to have glass transition temperature of −15.3° C. and gel fraction of 41.5%.

Example 6

A sheet according to Example 6 was made in the same manner as in Example 1 except using an N-methylol group containing acrylic acid ester copolymer resin (V) whose composition was modified from that of the N-methylol group containing acrylic acid ester copolymer resin (I), so as to have glass transition temperature of −22.8° C. and gel fraction of 60.5%.

Comparative Example 1

A sheet according to Comparative Example 1 was made in the same manner as in Example 1 except using a melamine crosslinking agent (BECKAMINE M3 from DIC Corporation) and a crosslinking promoter (CATALYST ACX from DIC Corporation) instead of the carbodiimide crosslinking agent (DICNAL HX from DIC Corporation) used in Example 1.

Comparative Example 2

A sheet according to Comparative Example 2 was made in the same manner as in Example 1 except using carboxylic group containing acrylic acid ester copolymer resin (I') (composition: 49.0 of ethyl acrylate/42.1 of butyl acrylate/ 6.9 of acrylonitrile/2.0 of acrylic acid; glass transition temperature: −20.9° C., gel fraction: 89.6%) instead of the N-methylol group containing acrylic acid ester copolymer resin (I) used in Example 1.

Comparative Example 3

A sheet according to Comparative Example 3 was made in the same manner as in Example 1 except using a carboxylic group containing acrylic acid ester copolymer resin (II') whose composition was modified from that of the carboxylic group containing acrylic acid ester copolymer resin (I') used in Comparative Example 1, so as to have glass transition temperature of 6.2° C. and gel fraction of 65.4%, instead of the N-methylol group containing acrylic acid ester copolymer resin (I) used in Example 1.

TABLE 1

|  |  | Example 1 | Example 2 | Example 3 | Example 4 | Example 5 |
|---|---|---|---|---|---|---|
| (Meth)acrylic Acid Ester Copolymer Resin | (I) | 100 | 100 |  |  |  |
|  | (II) |  |  | 100 |  |  |
|  | (III) |  |  |  | 100 |  |
|  | (IV) |  |  |  |  | 100 |
|  | (V) |  |  |  |  |  |
|  | (I') |  |  |  |  |  |
|  | (II') |  |  |  |  |  |

TABLE 1-continued

|  |  |  |  |  |  |  |
|---|---|---|---|---|---|---|
| Crosslinking Agent | DICNAL HX | 3.6 |  | 3.6 | 3.6 | 3.6 |
|  | CARBODILITE E-02 |  | 6.5 |  |  |  |
|  | BECKAMINE M-3 |  |  |  |  |  |
| Crosslinking Promoter | CATALYST ACX |  |  |  |  |  |
| Dye | DISPERSE WHITE HG-701 | 4.2 | 4.2 | 4.2 | 4.2 | 4.2 |
| Thickener | ARON B-300K | 2.0 | 2.0 | 2.0 | 2.0 | 2.0 |
| Foam Stablizer | DICNAL M-2 | 2.2 | 2.2 | 2.2 | 2.2 | 2.2 |
|  | DICNAL M-40 | 1.9 | 1.9 | 1.9 | 1.9 | 1.9 |
| Material Properties | Group Crosslinked to Resin | N-Methylol Group | N-Methylol Group | N-Methylol Group | N-Methylol Group | N-Methylol Group |
|  | Type of Crosslinking Agent | Carbodiimide | Carbodiimide | Carbodiimide | Carbodiimide | Carbodiimide |
|  | Resin Tg (DSC) | −25.9° C. | −25.9° C. | −17.6° C. | −10.1° C. | −15.3° C. |
|  | Gel Fraction of Resin (Insoluble of Ethyl Acetate) | 43.1% | 43.1% | 28.0% | 42.2% | 41.5% |
| Evaluation Categories | Self Adsorption Strength (to Glass) | 0.15 | 0.14 | 0.23 | 0.22 | 0.31 |
|  | Formaldehyde Dissipation Evaluation (○: 0.2 ppm or below) | ○ | ○ | ○ | ○ | ○ |
|  | Glossiness (at 60°) Excellent when 35 or over | 44.2 | 38.6 | 39.9 | 36.3 | 38.5 |

|  |  | Example 6 | Comparative Example 1 | Comparative Example 2 | Comparative Example 3 |
|---|---|---|---|---|---|
| (Meth)acrylic Acid Ester Copolymer Resin | (I) |  | 100 |  |  |
|  | (II) |  |  |  |  |
|  | (III) |  |  |  |  |
|  | (IV) |  |  |  |  |
|  | (V) | 100 |  |  |  |
|  | (I') |  |  | 100 |  |
|  | (II') |  |  |  | 100 |
| Crosslinking Agent | DICNAL HX | 3.6 |  | 3.6 | 3.6 |
|  | CARBODILITE E-02 |  |  |  |  |
|  | BECKAMINE M-3 |  | 7.3 |  |  |
| Crosslinking Promoter | CATALYST ACX |  | 0.3 |  |  |
| Dye | DISPERSE WHITE HG-701 | 4.2 | 4.2 | 4.2 | 4.2 |
| Thickener | ARON B-300K | 2.0 | 1.6 | 2.0 | 2.0 |
| Foam Stablizer | DICNAL M-2 | 2.2 | 2.2 | 2.2 | 2.2 |
|  | DICNAL M-40 | 1.9 | 1.9 | 1.9 | 1.9 |
| Material Properties | Group Crosslinked to Resin | N-Methylol Group | N-Methylol Group | Carboxyl Group | Carboxyl Group |
|  | Type of Crosslinking Agent | Carbodiimide | Melamine | Carbodiimide | Carbodiimide |
|  | Resin Tg (DSC) | −22.8° C. | −25.9° C. | −20.9° C. | 6.2° C. |
|  | Gel Fraction of Resin (Insoluble of Ethyl Acetate) | 60.5% | 43.1% | 89.6% | 65.4% |
| Evaluation Categories | Self Adsorption Strength (to Glass) | 0.08 | 0.07 | 0.11 | not Stuck |
|  | Formaldehyde Dissipation Evaluation (○: 0.2 ppm or below) | ○ | x | ○ | ○ |
|  | Glossiness (at 60°) Excellent when 35 or over | 46.1 | 45.6 | 32.7 | 30.9 |

As shown in Table 1, all the sheets according to Examples 1 to 6 had low dissipation of formaldehyde, proper self adsorption strengths, and excellent smoothness. On the other hand, the sheet according Comparative Example 1 using a melamine crosslinking agent had a poor result of formaldehyde dissipation evaluation. The sheet according to Comparative Example 2, not containing a N-methylol group but containing a carboxyl group, and using the acrylic acid ester copolymer resin having high gel fraction was poor in smoothness. The sheet according to Comparative Example 3, using carboxyl group containing acrylic acid ester copolymer resin of high glass transition temperature did not adhere to a glass board in the self adsorption strength measurement test, and was poor in smoothness as well.

The invention claimed is:

1. A method for producing a self-adsorbing foam sheet, the method comprising:
    making a resin composition for a self-adsorbing foam sheet, the resin composition including: 100 parts by mass of a (meth)acrylic acid ester copolymer resin which includes an N-methylol group, and whose glass transition temperature is −10° C. or less; and 1 to 20 parts by mass of a carbodiimide crosslinking agent;
    foaming the resin composition, to obtain foam of the resin composition; and
    shaping the foam into a sheet and after that, carrying out crosslinking reaction on the (meth)acrylic acid ester copolymer resin, wherein
    the (meth)acrylic acid ester copolymer resin consists of no less than 50% by mass of monomeric units derived from (meth)acrylic acid ester monomers and no more than 50% by mass of monomeric units derived from monomers copolymerizable with (meth)acrylic acid ester monomers,
    the monomers copolymerizable with (meth)acrylic acid ester monomer include a monomer having an N-methylol group, and
    monomeric units derived from the monomer having an N-methylol group are 0.1% to 10% by mass when the (meth)acrylic acid ester copolymer resin is 100% by mass.

2. The method according to claim 1, wherein gel fraction of the (meth)acrylic acid ester copolymer resin is 70% or less.

3. A method for producing a self-adsorbing laminated foam sheet that includes an adsorbing layer consisting of a self-adsorbing foam sheet and a supporting layer consisting of a base material, the method comprising:

making a resin composition for a self-adsorbing foam sheet, the resin composition including: 100 parts by mass of a (meth)acrylic acid ester copolymer resin which includes an N-methylol group, and whose glass transition temperature is −10° C. or less; and 1 to 20 parts by mass of a carbodiimide crosslinking agent;

foaming the resin composition, to obtain foam of the resin composition; and shaping the foam into a sheet on the base material, and after that, carrying out crosslinking reaction on the (meth)acrylic acid ester copolymer resin, to laminate the adsorbing layer to the supporting layer, wherein the (meth)acrylic acid ester copolymer resin consists of no less than 50% by mass of monomeric units derived from (meth)acrylic acid ester monomers and no more than 50% by mass of monomeric units derived from monomers copolymerizable with (meth)acrylic acid ester monomers, the monomers copolymerizable with (meth)acrylic acid ester monomer includes a monomer having an N-methylol group, and monomeric units derived from the monomer having an N-methylol group are 0.1% to 10% by mass when the (meth)acrylic acid ester copolymer resin is 100% by mass.

4. The method according to claim 3, wherein gel fraction of the (meth)acrylic acid ester copolymer resin is 70% or less.

5. The method according to claim 4, wherein the base material is a resin film.

* * * * *